(12) United States Patent
Liu

(10) Patent No.: US 6,257,152 B1
(45) Date of Patent: Jul. 10, 2001

(54) STRUCTURE OF PALLET FOR STACKING PALLETS WITH WHEELS

(76) Inventor: Ching-rong Liu, No. 31, Lane 9, Sec. 3, Chun-King N. Rd., Taipei (TW)

( * ) Notice: Subject to any disclaimer, the term of this patent is extended or adjusted under 35 U.S.C. 154(b) by 0 days.

(21) Appl. No.: 09/544,276

(22) Filed: Apr. 6, 2000

(51) Int. Cl.$^7$ .................................... B65D 19/38
(52) U.S. Cl. ...................... 108/53.3; 280/33.998
(58) Field of Search ................ 108/51.1, 53.1, 108/53.3; 280/33.998

(56) References Cited

U.S. PATENT DOCUMENTS

| | | | |
|---|---|---|---|
| 2,420,625 | * 5/1947 | Stalnaker et al. | 108/53.1 |
| 5,445,396 | * 8/1995 | Sebor | 108/53.3 |
| 5,505,140 | * 4/1996 | Wittmann | 108/51.1 |
| 5,823,549 | * 10/1998 | Morgan, Jr. | 108/53.3 |
| 6,199,487 | * 3/2001 | Coddington | 108/53.3 |

* cited by examiner

Primary Examiner—Peter M. Cuomo
Assistant Examiner—Jerry A. Anderson
(74) Attorney, Agent, or Firm—Bacon & Thomas, PLLC

(57) ABSTRACT

A structure of pallet for stacking pallets with wheels, each pallet has a stop barrier on the three sides of thereof, the remaining one side has a beveled surface tilting downward, two longitudinal grooves are provided on the two mutual opposite longitudinal sides of the pallet. A plurality of insertion holes are provided between the grooves. The pallet has thereunder a fixed wheel set and a movable wheel set, and has on the bottom thereof a plurality of engaging portions and engaging strips. When the pallets are stacked in a mutual orthogonal state, the engaging strips and engaging portions on the bottom of the upper pallet are respectively engaged in the insertion holes and longitudinal grooves on the lower pallet, so that the pallet structure has the function of direction correcting for positioning when in stacking of the pallets, and displacement and falling down of the pallets are surely prevented.

4 Claims, 10 Drawing Sheets

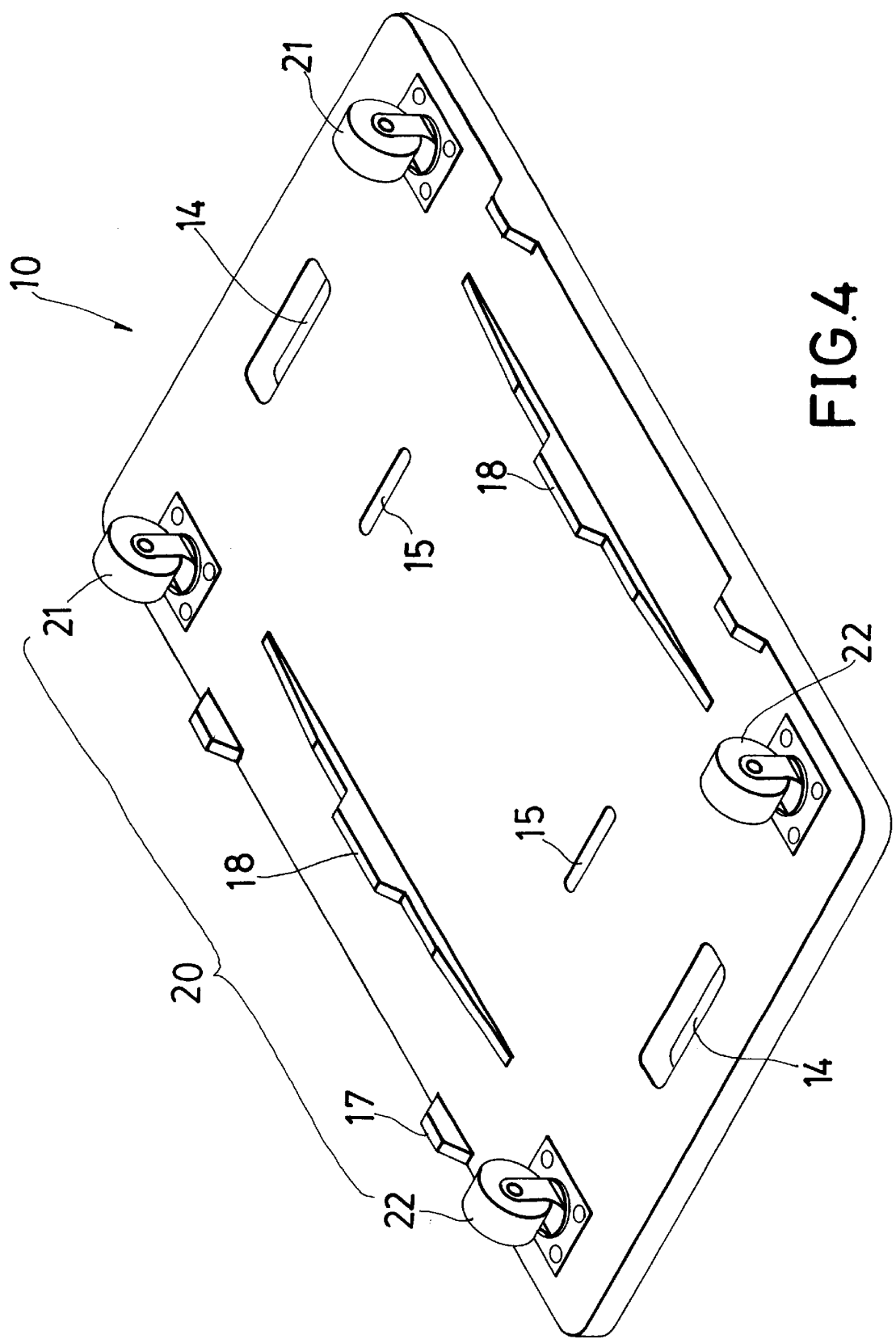

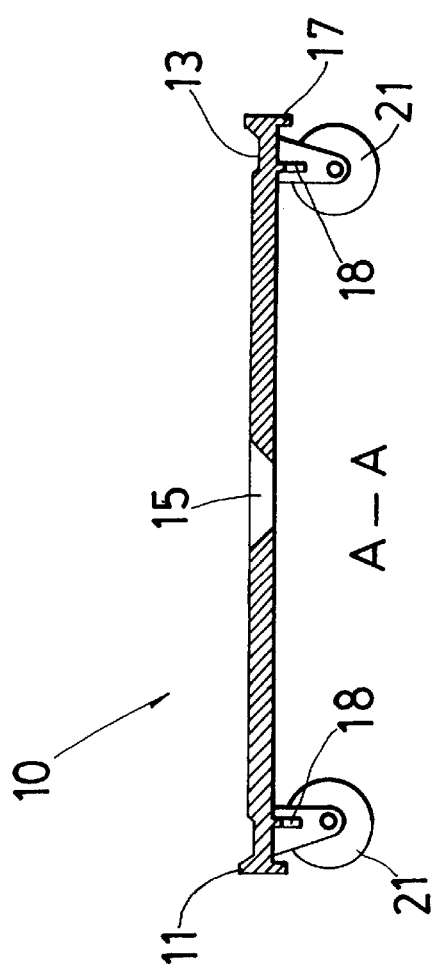
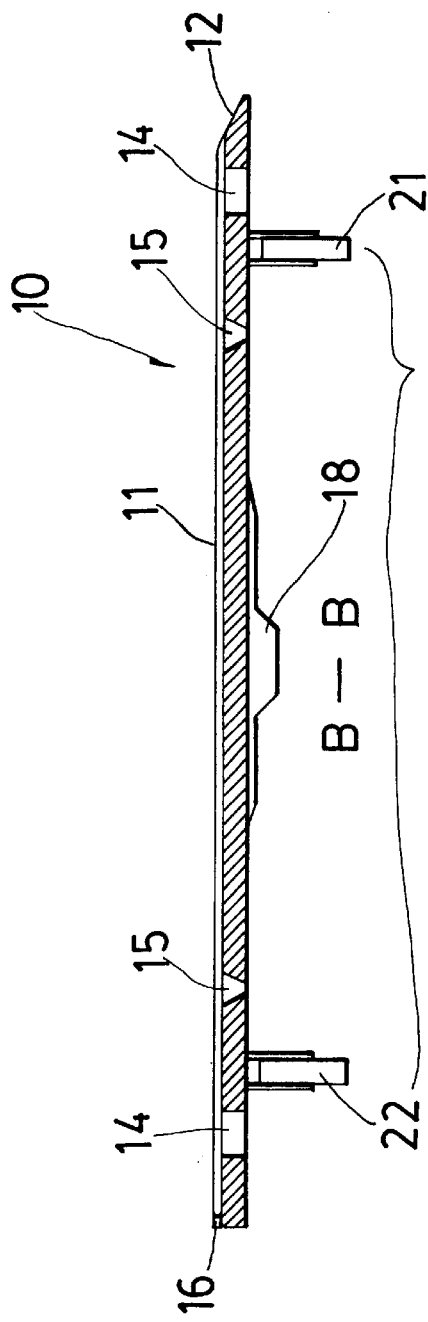

STRUCTURE OF PALLET FOR STACKING PALLETS WITH WHEELS

BACKGROUND OF THE INVENTION

1. Field of the Invention

The present invention is related to a structure of pallet for stacking pallets with wheels, and especially to a pallet structure for stacking pallets with wheels in the same orientation or mutually orthogonally. The pallets all have the function of direction correcting for positioning during stacking.

2. Description of the Prior Art

In transporting goods in a factory or a transporting station, the goods mostly are transported after stacking for the purpose of convenient and efficient transporting and saving manpower and working hours. Pallets can be divided into two kinds, namely, pallets with wheels and pallets without wheels. The pallets without wheels have larger areas for stacking of goods, but they need oil pressure trailers to get the object of transporting; while the pallets with wheels are mounted beneath themselves with wheel sets, they can get the object of transporting without an oil pressure trailer, and thus is convenient.

FIGS. 1 and 2 show a conventional movable pallet, it is provided beneath the pallet 30 with two movable wheels 40 and two fixed wheels 41 to allow the pallet 30 to change direction. The rearside of the pallet 30 is opened, while the remaining three sides are provided with a continuous stop barrier 31 formed integrally with the pallet 30. Therefore, when goods are placed on the pallet 30, they are limited by the stop barrier 31 from dropping out of the pallet 30. The pallet 30 is further provided with a plurality of slide strips 32 for reducing friction between the goods and the pallet 30. The pallet 30 is provided with two grooves 33 on the bottom and near the right and left sides thereof respectively, width of the two grooves 33 is slightly larger than that of the stop barrier 31 to allow mutual lapping of a plurality of pallets 30.

It can be seen from the above statement that, when in stacking of movable pallets, the grooves 33 on a pallet 30 are engaged with the stop barrier 31 of a lower pallet 30 to get the object of stacking.

Although the pallets can get the object of stacking, the stop barrier 31 provided on the three sides leaving the other one side opened makes the upper pallet 30 tend to drop from this opened side when the pallets are stacked. The pallets can only be stacked in a mutual orthogonal state; this makes them occupy a larger storing space. Therefore, the structure thereof for stacking shall still be improved.

SUMMARY OF THE INVENTION

In view of the above statement, the primary object of the present invention is to provide a structure of pallet for stacking pallets with wheels. Wherein, each pallet is provided on the bottom of thereof with movable wheels and fixed wheels, a stop barrier is provided on the three sides of the pallet, the remaining one side is provided with a beveled surface, two longitudinal grooves are provided on the two mutual opposite longitudinal sides of the pallet, a plurality of insertion holes are provided between the grooves, and a plurality of engaging portions and engaging strips are provided on the bottom of the pallet. When the pallets are stacked mutually, they are stacked in a mutual orthogonal state, the engaging strips and the engaging portions on the bottom of the pallet can be respectively engaged in the insertion holes and the longitudinal grooves on a lower pallet. So that when the pallets are stacked mutually, they have the function of direction correcting for positioning, and displacement and falling down of the pallets can be surely prevented.

The present invention will be apparent in its object and detailed structure by the persons skilled in the art after reading the detailed description of the preferred embodiment thereof in reference to the accompanying drawings.

BRIEF DESCRIPTION OF THE DRAWINGS

FIG. 4 is a perspective view showing the bottom of the present invention;

FIG. 5 is a sectional view taken from a sectional line A—A in FIG. 1;

FIG. 6 is a sectional view taken from a sectional line B—B in FIG. 1;

DETAILED DESCRIPTION OF THE PREFERRED EMBODIMENT

Figure 1:
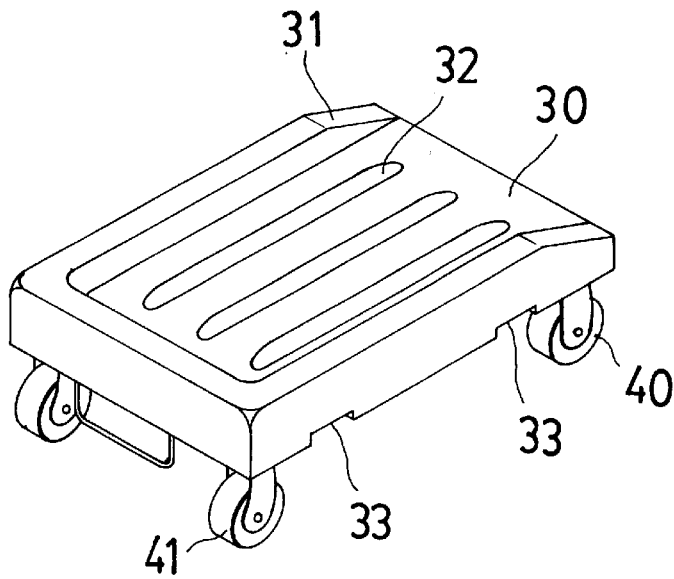
FIG. 1 is a perspective view of a conventional pallet.
Figure 2:
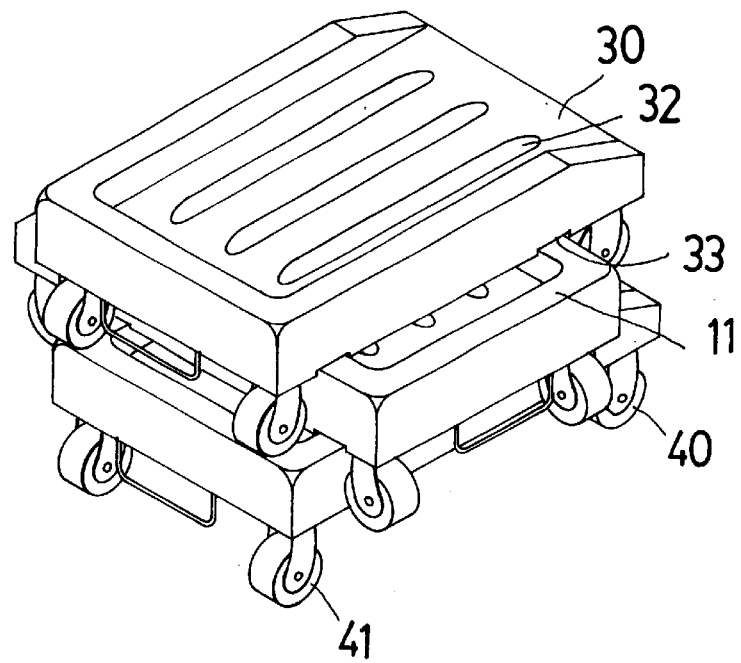
FIG. 2 is a schematic perspective view showing stacking of the conventional pallets.
Figure 3:
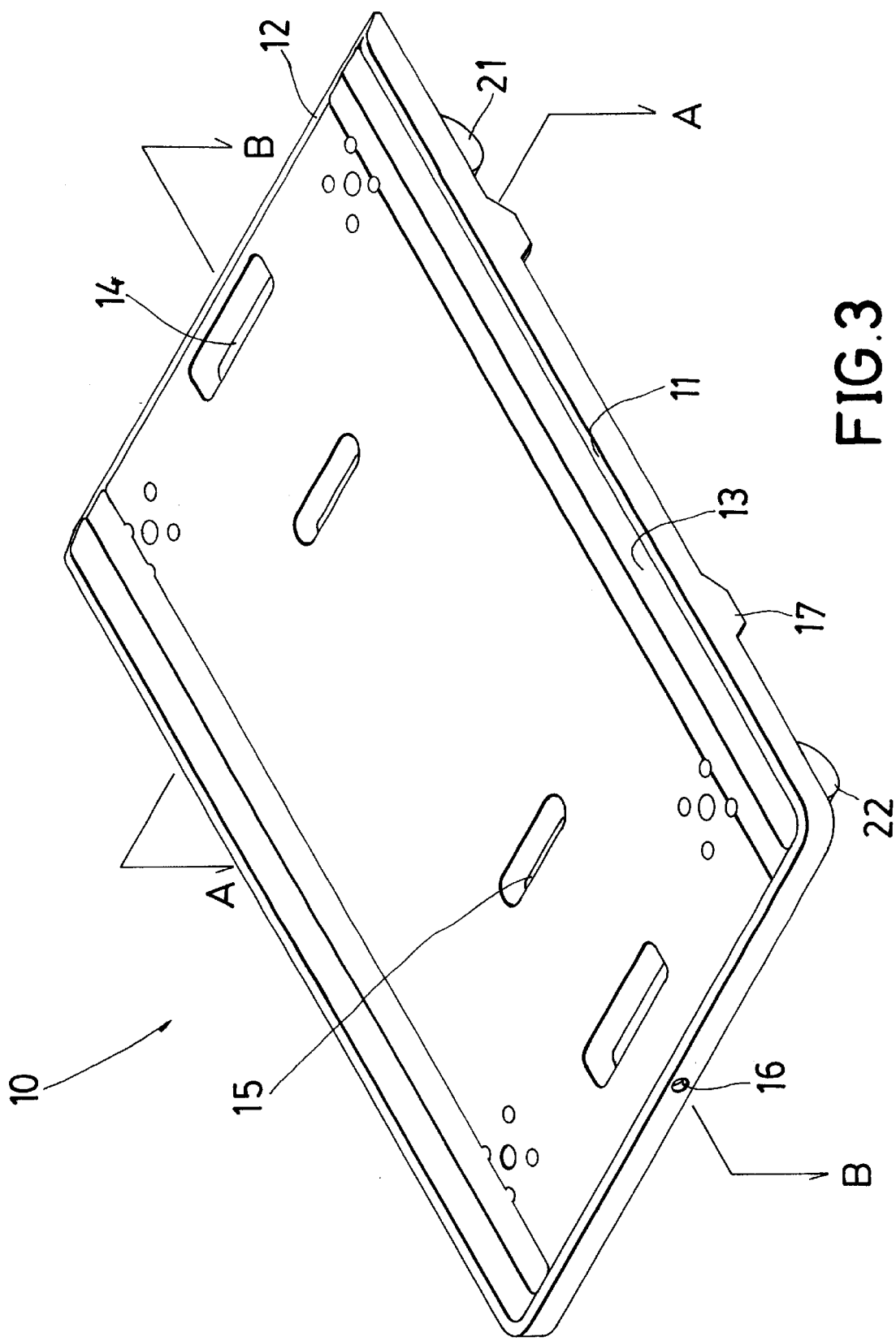
FIG. 3 is a perspective view of the present invention.

Referring to FIG. 3 to FIG. 6, the pallet 10 shown has a stop barrier 11 on the three sides of its body, the remaining one side is provided with a beveled surface 12 tilting downward, two longitudinal grooves 13 are provided on the two mutual opposite longitudinal sides of the body of the pallet 10. A plurality of grasping holes 14 and insertion holes 15 are provided between the grooves 13, and a through hole 16 is provided at a suitable position on the body of the pallet 10 for pulling. The stop barrier 11 of the body of the pallet 10 is provided thereunder with a plurality of engaging portions 17, and a plurality of engaging strips 18 are provided on the bottom of the body of the pallet 10 inside of the engaging portions 17. The body of the pallet 10 is provided thereunder with a fixed wheel set 20 and a movable wheel set 21.

By forming the beveled surface 12 on one side of the pallet 10, convenience of moving goods up onto and down from the pallet 10 can be obtained. While the stop barrier 11 provided on the other three sides of the pallet 10 can prevent the goods from dropping out of the pallet 10 when they are placed in the pallet 10. During transporting goods with the pallet 10, a user can extend a rope or a rod through the through hole 16 for pulling the pallet 10 to get the object of transporting goods.

Figure 7:
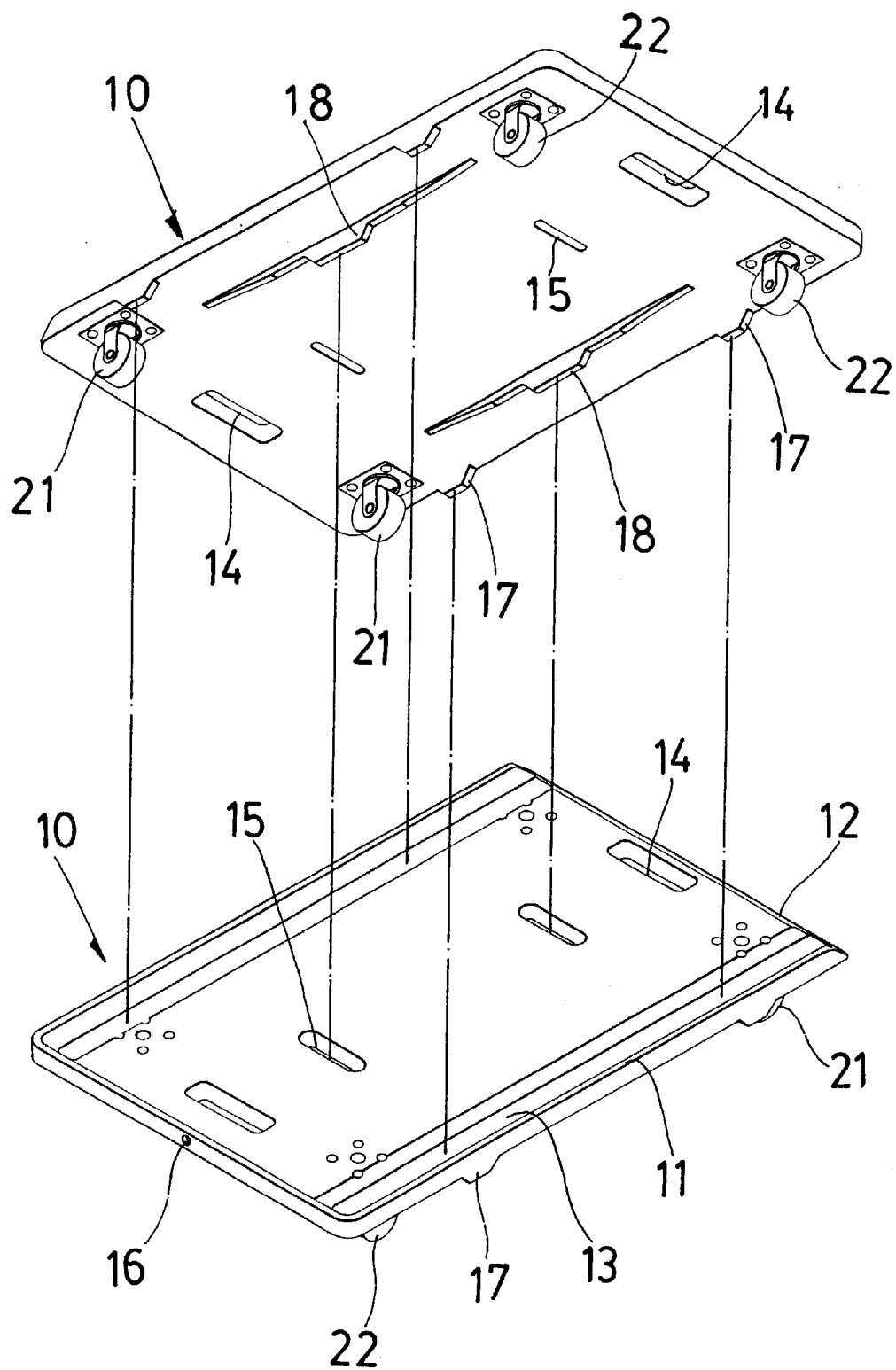
FIG. 7 is a schematic perspective view showing the state before stacking of the present invention.
Figure 8:
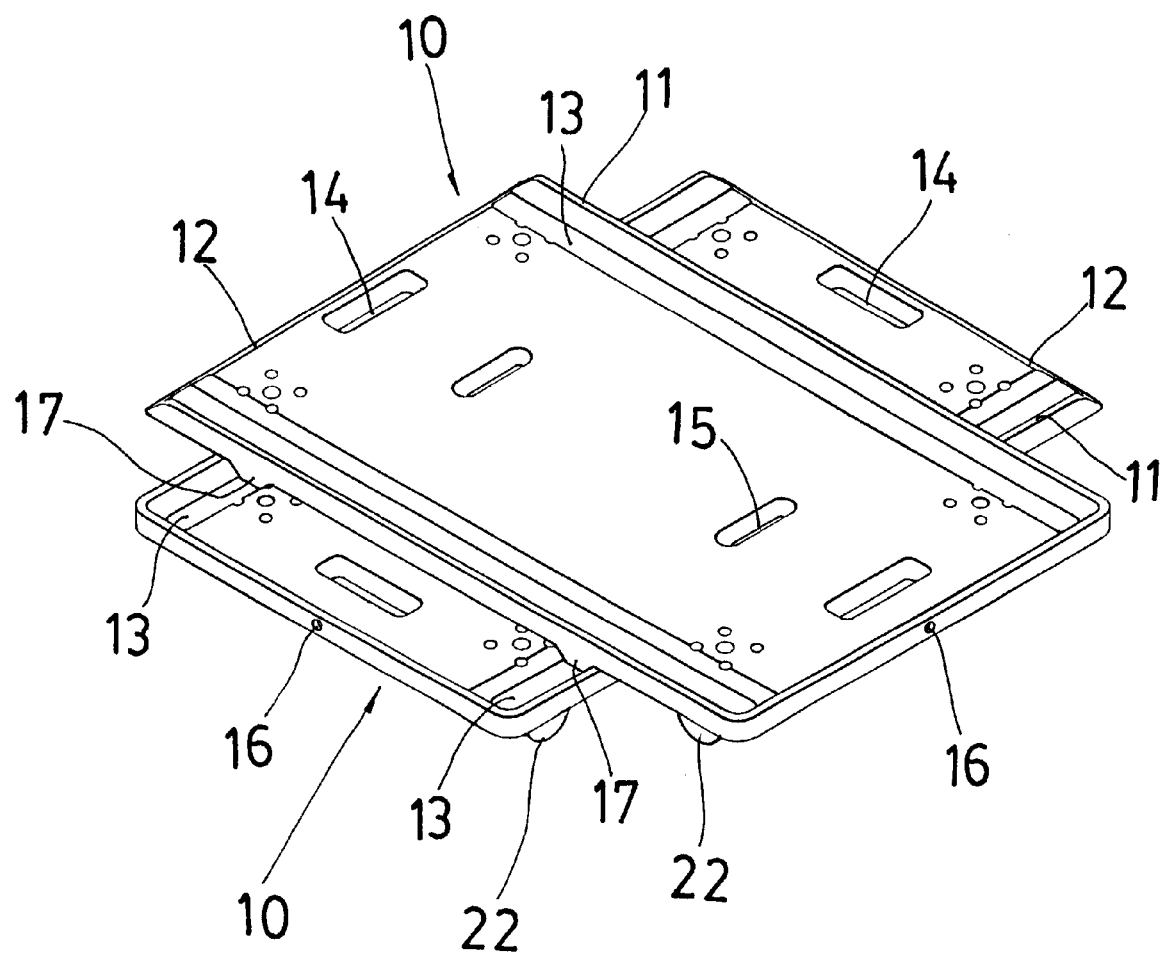
FIG. 8 is a schematic perspective view showing stacking of the present invention.

Referring to FIGS. 7 and 8, when the pallets in the drawings are stacked mutually, they are stacked in a mutual orthogonal state. Wherein, the engaging strips 18 and the engaging portions 17 on the bottom of the body of the pallet 10 can be respectively engaged in the insertion holes 15 and the longitudinal grooves 13 on the body of a lower pallet. So that when the pallets 10 are stacked mutually, they have the function of direction correcting for positioning, and displacement and falling down of the pallets 10 can be surely prevented.

Figure 9:
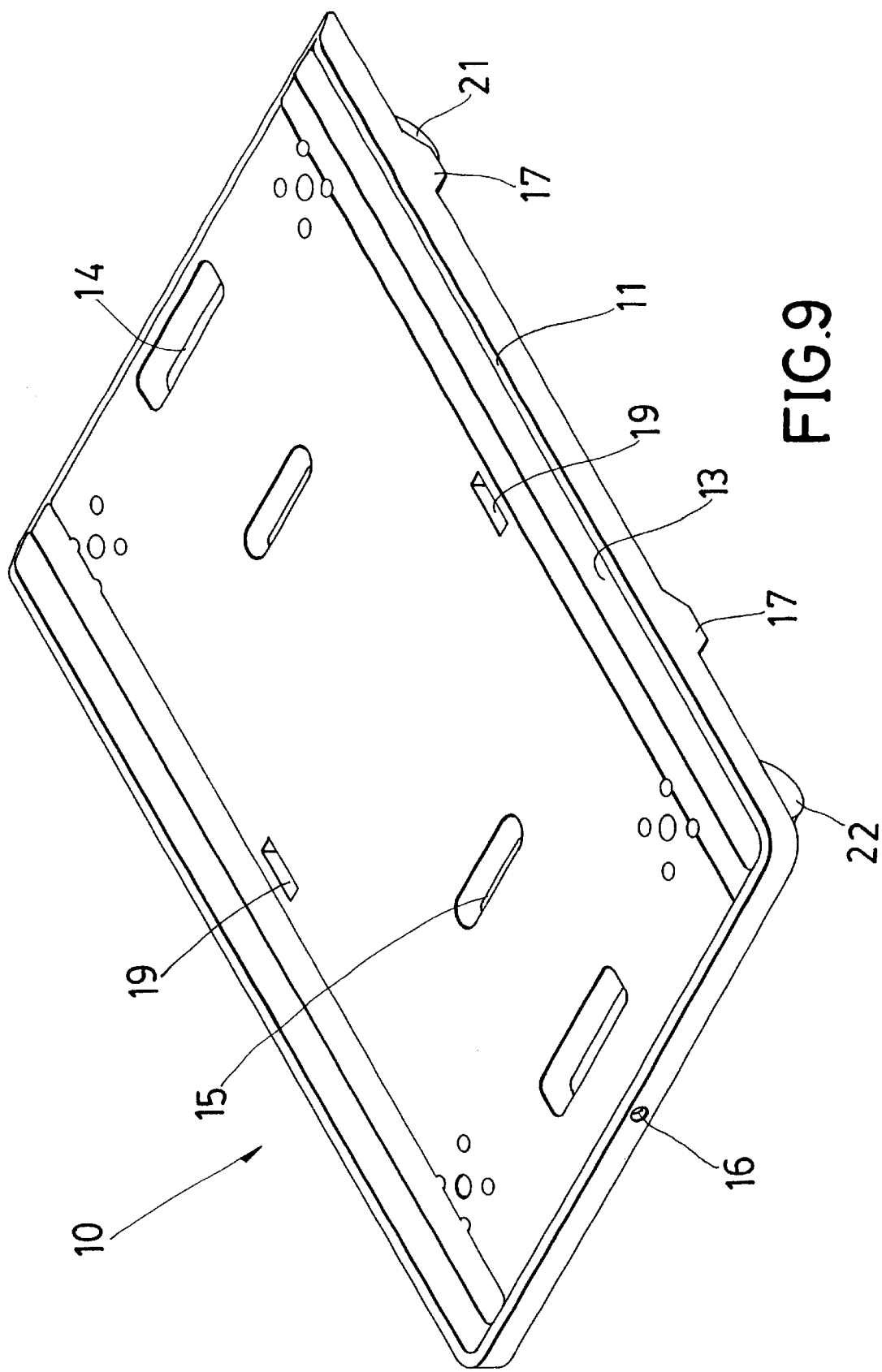
FIG. 9 is a perspective view of another embodiment of the present invention.
Figure 10:
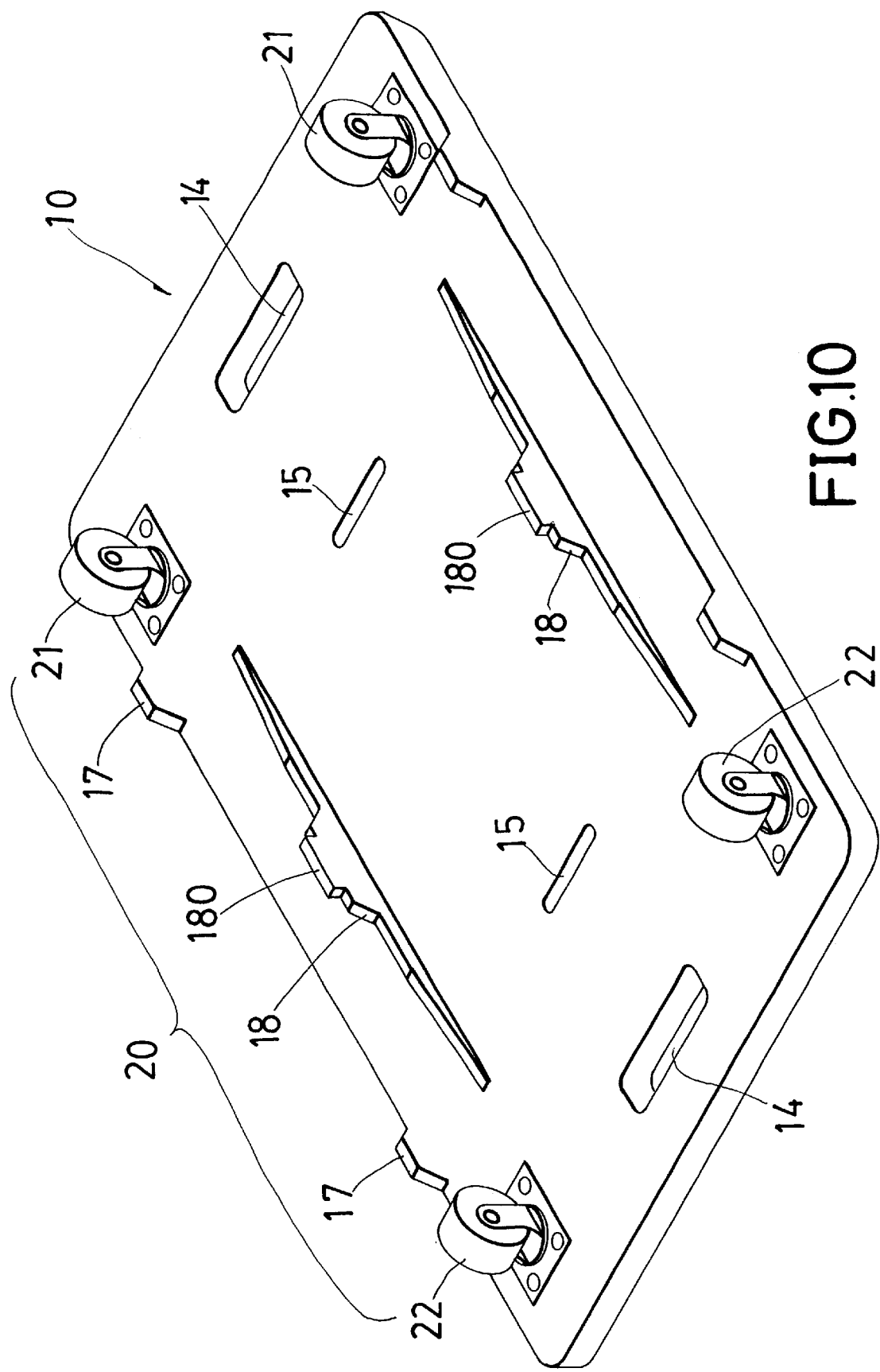
FIG. 10 is a schematic perspective view showing the bottom of the embodiment shown in FIG. 9.
Figure 11:
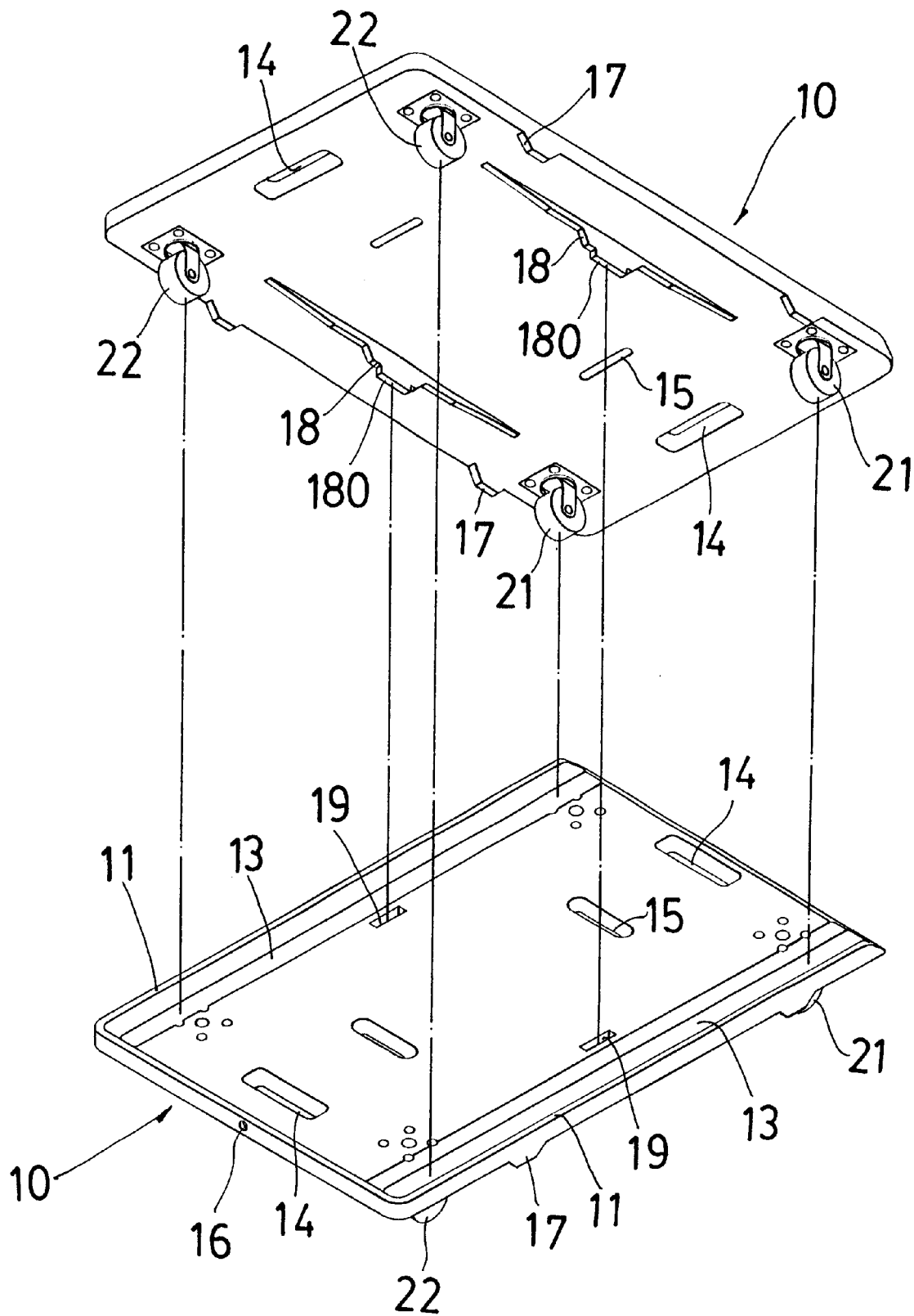
FIG. 11 is a schematic perspective view showing the state before stacking of the embodiment shown in FIG. 9.
Figure 12:
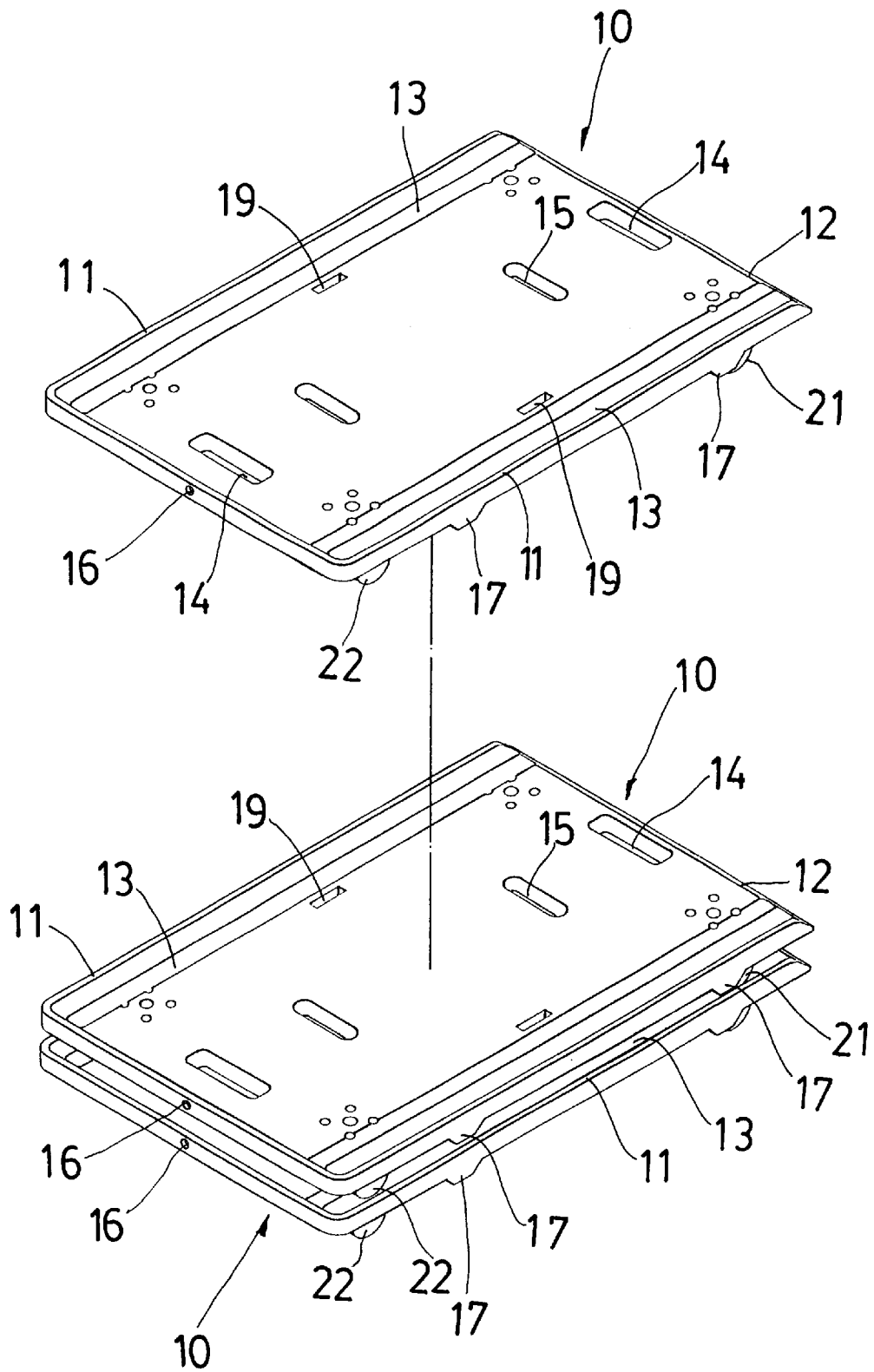
FIG. 12 is a schematic perspective view showing stacking of the embodiment shown in FIG. 9.

Referring to FIGS. 9 to 12, when the pallets 10 with wheels in the drawings are stacked mutually, they are stacked in a mutual orthogonal state too. Wherein, the body of each pallet 10 is provided on the top surface thereof with two slots 19 (as shown in FIG. 9), and two fixing protuberances 180 are provided on the two engaging strips 18 (as shown in FIG. 10). Thereby, when the pallets 10 are mutually stacked in the same orientation, the fixed wheel set 20 and the movable wheel set 21 on an upper pallet 10 are inserted into the longitudinal grooves 13 on a lower pallet 10, while the two fixing protuberances 180 of the latter are inserted into the two slots 19 of the former. Thereby, the pallets 10 are mutually stacked and engaged.

The structure for stacking pallets 10 with wheels of the present invention not only can have the pallets 10 stacked in the same orientation or in a mutual orthogonal state, but also can have the function of direction correcting for positioning to surely prevent displacement and falling down of the pallets 10.

Having thus described the technical structure of my invention with novelty; therefore, what I claim as new and desire to be secured by Letters Patent of the United States are:

1. A structure of pallet for stacking pallets with wheels, said pallets are provided each with a body, a fixed wheel set and a movable wheel set, said fixed wheel set and movable wheel set are provided under said body of said pallet; said body of said pallet is provided on three sides thereof with a stop barrier, and on remaining one side thereof with a beveled surface tilting downward, said structure of pallet is characterized by that, said body of said pallet is provided on two mutual opposite longitudinal sides thereof with two longitudinal grooves, and between said grooves with a plurality of insertion holes, and is provided on the bottom thereof with a plurality of engaging portions and a plurality of engaging strips;

when said pallets are stacked in a mutual orthogonal state, said engaging strips and engaging portions on the bottom of said pallet body on the upper one of said pallets are respectively engaged in said insertion holes and said longitudinal grooves on the lower one of said pallets, so that said pallet structure has the function of direction correcting for positioning when stacking said pallets, and displacement and falling down of said pallets are surely prevented.

2. A structure of pallet for stacking pallets with wheels as stated in claim 1, wherein, said body of said pallet is provided with a through hole for pulling said pallet.

3. A structure of pallet for stacking pallets with wheels as stated in claim 1, wherein, said body of said pallet is provided with a plurality of grasping holes in order to provide convenience for handling.

4. A structure of pallet for stacking pallets with wheels as stated in claim 1, wherein, said body of said pallet is provided on the top surface thereof with a plurality of slots, and a plurality of fixing protuberances are provided on said engaging strips, thereby, said pallets may be mutually stacked in a same orientation, said fixing protuberances on the upper one of said pallets are inserted into said slots on the lower one of said pallets.

* * * * *